United States Patent [19]

Rubenstein et al.

[11] Patent Number: 5,584,952
[45] Date of Patent: Dec. 17, 1996

[54] METHOD AND APPARATUS FOR MAKING DRIP IRRIGATION LINES AND PREFORMED MEMBER FOR USE THEREIN

[75] Inventors: Zvi Rubenstein, Timrat; Valish Malkin, Doar Gvat, both of Israel

[73] Assignee: Hydromatic Ltd., Haemek, Israel

[21] Appl. No.: 290,580

[22] Filed: Aug. 15, 1994

[30] Foreign Application Priority Data

Sep. 10, 1993 [IL] Israel ........................ 106973

[51] Int. Cl.$^6$ .................. B05B 1/20; B29C 47/02; B32B 31/18
[52] U.S. Cl. .................. 156/244.13; 156/244.19; 156/244.22; 156/259; 156/500; 156/501; 156/522; 239/542
[58] Field of Search ................ 156/259, 244.19, 156/244.15, 244.18, 244.22, 66, 500, 501, 510, 522, 552, 244.13; 239/542

[56] References Cited

U.S. PATENT DOCUMENTS

| | | | |
|---|---|---|---|
| 3,219,084 | 11/1965 | Ausnit | 383/65 |
| 3,896,999 | 7/1975 | Barragan | 239/542 |
| 4,047,995 | 9/1977 | Leal-Diaz | 156/217 |
| 4,285,472 | 8/1981 | Okada | 239/542 |
| 4,430,020 | 2/1984 | Robbins | 239/542 |
| 4,528,224 | 7/1985 | Ausnit | 156/259 |
| 4,541,569 | 9/1985 | Langa | 239/542 |
| 4,763,842 | 8/1988 | Dunn | 239/542 |
| 5,022,940 | 6/1991 | Mehoudar | 156/244.19 |
| 5,106,021 | 4/1992 | Gilead | 239/542 |
| 5,271,786 | 12/1993 | Gorney | 156/244.22 |

*Primary Examiner*—Daniel Stemmer
*Attorney, Agent, or Firm*—Benjamin J. Barish

[57] ABSTRACT

A method and apparatus for making drip irrigation lines, by forming two (or more) tubes in side-by-side relation joined together at a juncture including a plurality of preformed members bonded to and within the juncture at spaced locations along the longitudinal axes of the preformed members and of the juncture. Each of the preformed members includes a pair of flow-reducing, groove formations, one on each side of the longitudinal axis of the preformed member. The juncture is slit along the longitudinal axes of the preformed members to thereby form two (or more) drip irrigation lines each integrally formed with a section of the plurality of preformed members, each section having one of the groove formations serving as a flow-reducer element in the respective line.

18 Claims, 4 Drawing Sheets

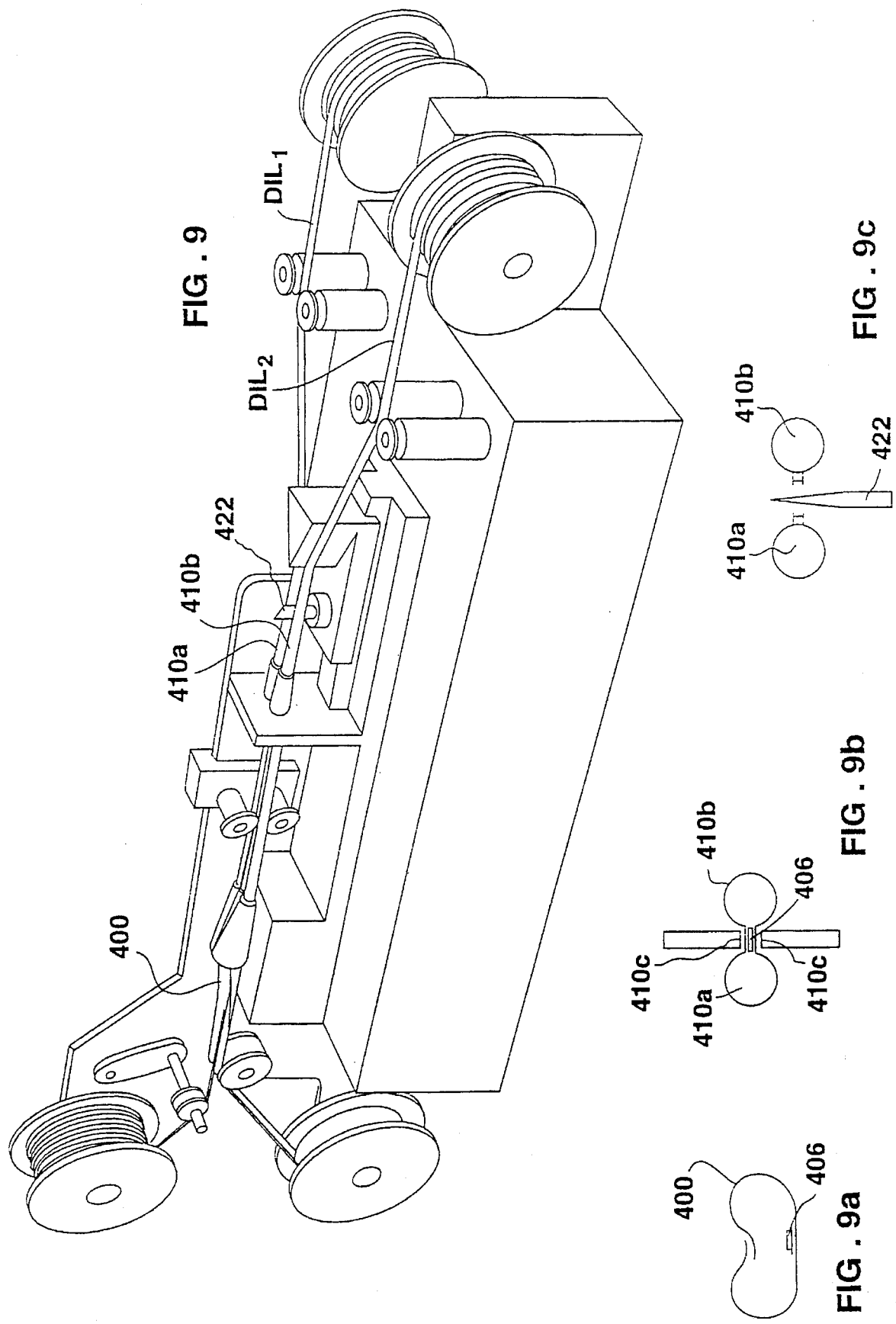

5,584,952

METHOD AND APPARATUS FOR MAKING DRIP IRRIGATION LINES AND PREFORMED MEMBER FOR USE THEREIN

FIELD AND BACKGROUND OF THE INVENTION

The present invention relates to a method and apparatus for making drip irrigation lines, and also to a preformed member useful in such method.

Drip irrigation lines generally include a continuous tube having a plurality of openings therethrough along spaced intervals of the tube, and a plurality of flow-reducer elements bonded to one face of the tube in communication with the openings so as to reduce the flow of the outletted irrigation water to drops or trickles. Such drip irrigation lines are gaining widespread use because of their many advantages, including efficiency in the delivery of the irrigating water directly to the plant roots, and substantial savings in the required irrigation water and/or additives thereto.

Such drip irrigation lines are generally produced at the present time by extruding the plastic tube, bonding the flow-reducer elements to the extruded tube at longitudinally-spaced intervals, and then forming the outlet openings through the tube at longitudinally-spaced intervals aligned with the outlet ends of the flow-reducer elements. U.S. Pat. Nos. 3,981,452, 5,022,940, 5,271,786 and 5,282,916 illustrate examples of such-known extrusion processes. Extrusion apparatus, however, is very expensive, and the initial cost of such apparatus therefore constitutes a substantial item of cost in manufacturing such drip irrigation lines. This is particularly true in the production of inexpensive thin-wall lines since both the initial cost, and the maximum rate of extrusion, of such apparatus are substantially the same whether thick-wall or thin-wall tubes are being extruded. In addition, high precision is required in forming the outlet openings in the tube, since any misalignment of the outlet opening with respect to the outlet end of the flow-reducer elements incorporated in the tube, will deleteriously affect the operation of the drip irrigation line.

OBJECTS AND BRIEF SUMMARY OF THE INVENTION

An object of present invention is to provide a method, and also apparatus, for making drip irrigation lines having advantages in one or both of the above respects.

According to the present invention, there is provided a method of making drip irrigation lines comprising: preparing a plurality of preformed members of predetermined thickness each having a longitudinal axis and preformed with a pair of groove formations of smaller depth than the thickness of the preformed members, one on each side of its longitudinal axis; forming at least two tubes in side-by-side relation joined together at a juncture including the plurality of preformed members bonded to and within the juncture at spaced locations along the longitudinal axes of the preformed members and of the juncture; and slitting the juncture and the preformed members along their longitudinal axes, to thereby form at least two drip irrigation lines each integrally formed with a section of the plurality of preformed members, each section having one of the groove formations serving as a flow-reducer element in the respective line.

According to further features in the preferred embodiment of the invention described below, each of the preformed members is preformed with inlet recess means and with outlet recess means both located and configured such that when the juncture and preformed members are slit along their longitudinal axes, the inlet recess means serves as an inlet to each of the flow-reducer elements of the respective line, and the outlet recess means serves as an outlet from the respective flow-reducer element of the respective line.

More particularly, according to the arrangement in the described preferred embodiments, the inlet recess means are in the form of a pair of edge recesses opening at opposite sides of the preformed member, and the outlet recess means are in the form of a common internal recess traversing across the longitudinal axis of the preformed member so as to be slit at the time the juncture and preformed members are slit.

The above method is particularly useful in an extrusion process, wherein the tubes and the juncture thereof are formed by extrusion, and the preformed member is bonded within the juncture at the time of extrusion. The method enables the productivity of the extrusion apparatus to be substantially doubled with very little increase in the overall cost of the apparatus, thereby enabling a substantial reduction in the manufacturing cost particularly when producing thin-wall drip irrigation lines. In addition, the method eliminates the need for high precision in producing the outlet openings since the outlet openings are automatically produced during the slitting operation. The foregoing advantages thus make the invention particularly useful in an extrusion process, but the invention could also advantageously be used in a non-extrusion process, e.g., wherein the pair of tubes are formed by seaming sheet material and bonding the preformed member within the juncture at the time of producing the seam.

The invention also provides apparatus for making drip irrigation lines, and also a preformed member for use in making drip irrigation lines in accordance with the novel method.

While the invention is particularly useful wherein only two tubes are formed at one time with a single juncture between them, the invention could also be used where more than two tubes are formed, with a juncture between pair of adjacent tubes, and including a plurality of preformed members bonded to and within each juncture.

Further features and advantages of the invention will be apparent from the description below.

BRIEF DESCRIPTION OF THE DRAWINGS

The invention is herein described, by way of example only, with reference to the accompanying drawings, wherein:

FIG. 7a illustrates a modification in the apparatus of FIG. 1 when the preformed members are introduced in the manner shown in FIG. 7;

and FIG. 9 illustrates apparatus for making drip irrigation lines in accordance with the invention but producing seam tubes rather than extruded tubes, FIGS. 9a, 9b and 9c illustrating the product at different stages in its manufacture.

DESCRIPTION OF PREFERRED EMBODIMENTS

Figure 1:
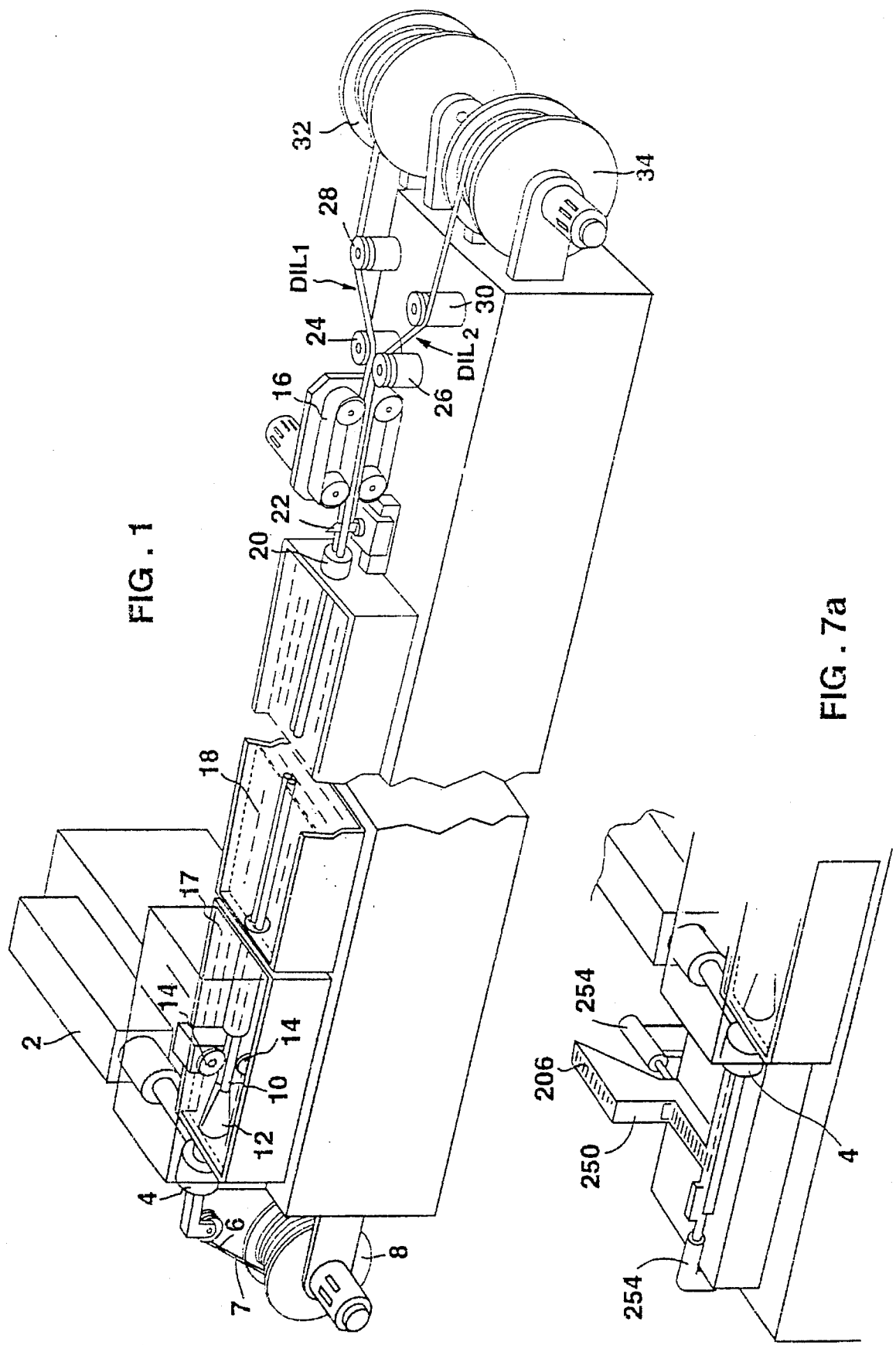
FIG. 1 illustrates one form of apparatus constructed in accordance with the present invention.

The apparatus illustrated in FIG. 1 comprises an extruder 2 having an extrusion head 4 through which is extruded the plastic material defining the tube of the drip irrigation line. A plurality of preformed members 6, which define the flow-reducer elements in the drip irrigation line to be produced by the apparatus, are supplied in the form of a strip 7 from a reel 8 to the extrusion head 4. Members 6 are bonded to the extruded plastic material at the time of extrusion, so that the extruded product 10 leaving the extrusion head 4 includes both the plastic tube (or tubes in this case), and the preformed members 6 defining the flow-reducer elements therein.

The extruded product 10 leaving the extrusion head 4 is pulled through a calibrator unit 12 and a pair of pinch rollers 14 by a caterpillar 16 which accelerates the extruded product so that the plastic is stretched to a smaller diameter determined by the calibrator unit 12. Calibrator unit 12 is enclosed within a cooling unit 17 for cooling the extruded product 10. The extruded product 10 is then passed through one or more additional cooling units, as shown at 18, to fully rigidify and set the extruded plastic before the extruded produce exits through an outlet opening 20.

Figure 3:
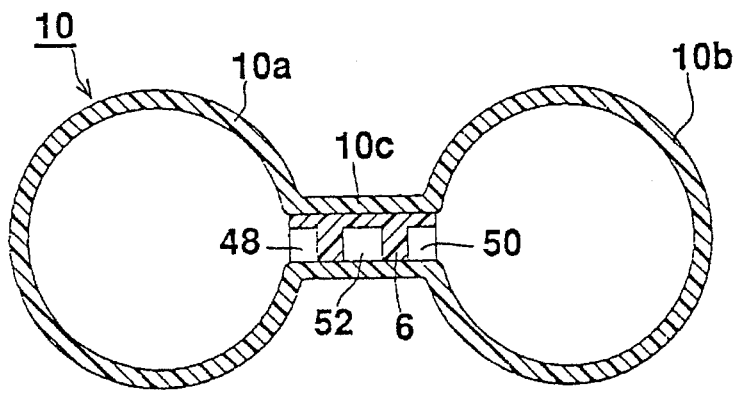
FIG. 3 is a sectional view illustrating the extruded product produced by the apparatus of FIG. 1 before the extruded product is slit.

FIG. 3 illustrates the configuration of the extruded product 10 as it exits from the outlet opening 20 of the extrusion apparatus. As shown in FIG. 3, the extruded product 10 at this stage includes two extruded tubes 10a, 10b in side-by-side relation and joined together by a juncture 10c produced by the pinch rollers 14. The preformed members 6 are bonded to and within juncture 10c.

Figure 4:
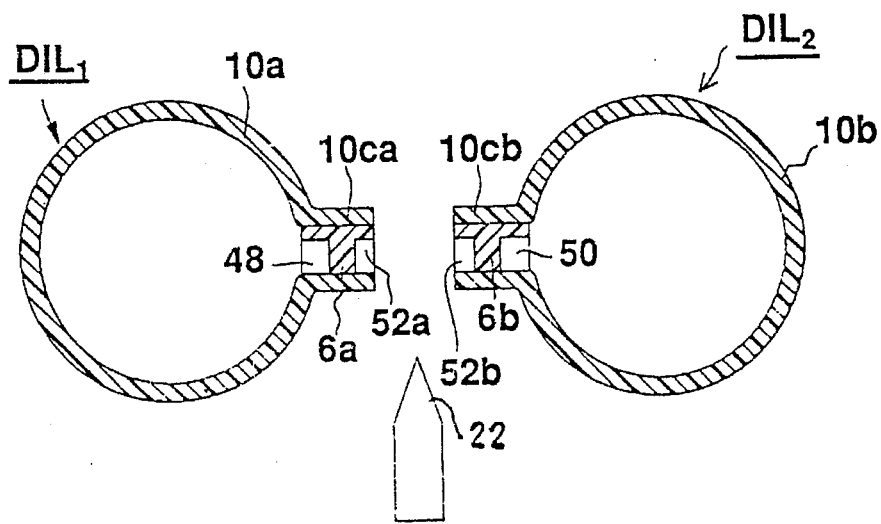
FIG. 4 is a similar view after the extruded product has been split to produce two drip irrigation lines.

The apparatus illustrated in FIG. 1 further includes a slitter 22 aligned with the center line (i.e., the longitudinal axis) of the juncture 10c joining the two tubes 10a, 10b. Slitter 22 slits the extruded product 10 into two sections as shown in FIG. 4. Each section thus constitutes one of the two extruded tubes 10a, 10b, together with one-half the juncture 10c and one-half of the preformed members 6. As will be described below, each of two sections constitutes a separate drip irrigation line, shown at DIL$_1$ and DIL$_2$ in FIG. 1. The two drip irrigation lines are guided by guide rollers 24, 26, 28, 30, to separate take-up reels 32, 34.

The extrusion apparatus illustrated in FIG. 1 may be of a generally known construction, except for the configuration of the extrusion head 4 and calibrator 12, and the provision of the pinch rollers 14, which produce the "tube doublet" (i.e., two tubes joined by the juncture 10c), and the slitter 22 which slits the tube doublet into two tubes.

Figure 2:
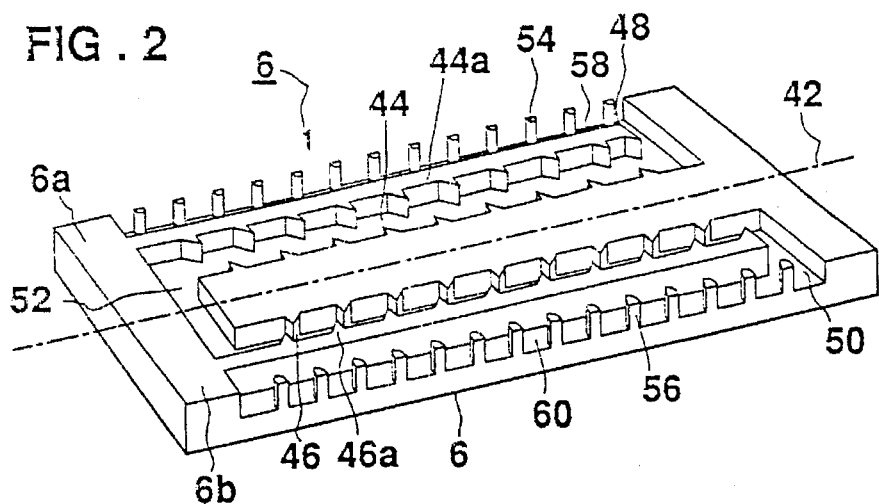
FIG. 2 illustrates one form of preformed member for use in making drip irrigation lines according to the present invention.

FIG. 2 more particularly illustrates the construction of one of the preformed members 6 bonded to and within the juncture 10c of the extruded product 10 exiting at 20 from the extrusion apparatus.

The longitudinal axis of preformed member 6 is along its center line 42, and is aligned with the longitudinal axis (the center line) of the juncture 10c with which slitter 22 is also aligned. Member 6, of predetermined thickness, is preformed with an elongated groove 44, 46, of smaller depth than the thickness of the preformed member extending the length of the member on each side of its longitudinal axis 42. Each elongated groove 44, 46 is formed with a plurality of baffles 44a, 46a, defining a labyrinth. One end of member 6 is formed with a pair of edge recesses 48, 50, serving as inlets communicating with one end (the inlet end) of each of the labyrinths 44, 46. The opposite end of member 6 is formed with a common internal recess 52 communicating with the opposite (outlet) ends of the two elongated grooves 44, 46, and traversing the longitudinal axis 42 of the preformed member.

In order to minimize clogging of the inlet recesses 48, 50, the preformed member 6 is further formed with a plurality of posts 54, 56 along the opposite sides of the member. These posts define further inlet recesses 58, 60, parallel to the two inlet recesses 48, 50 communicating with the inlet ends of the respective labyrinths of the elongated grooves 44, 46 and baffles 44a, 46a, respectively.

As shown in FIG. 4, the splitting of the juncture section 10c, and the preformed members 6 bound within it, along longitudinal axis 42 produces the two drip irrigation lines DIL$_1$, DIL$_2$. Each such line includes: a tube 10a, 10b for the pressurized water; a one-half section of the juncture section 10ca, 10cb; and a one-half section of the preformed members 6a, 6b bonded to and within the respective juncture section. Section 6a of the preformed member 6 includes an inlet (edge recess 48) to its labyrinth (elongated groove 44 and baffles 44a), and an outlet (recess half 52a); section 6b of the preformed member includes an inlet (edge recess 50) to its labyrinth (elongated groove 46 and baffles 46a), and an outlet (recess half 52b) therefrom.

The single extrusion apparatus illustrated in FIG. 1 has thus produced two drip irrigation lines DIL$_1$, DIL$_2$ in the time and with basically the same equipment heretofore used to produce a single line, thereby effectively doubling the productivity of the extrusion apparatus. In addition, the outlet (52a, 52b) of each of the drip irrigation lines is automatically produced for each flow-reducer element in the line as a result of the splitting operation, thereby eliminating the need for precisely locating the outlet openings in the conventional extrusion technique for manufacturing drip irrigation lines.

Figure 5:
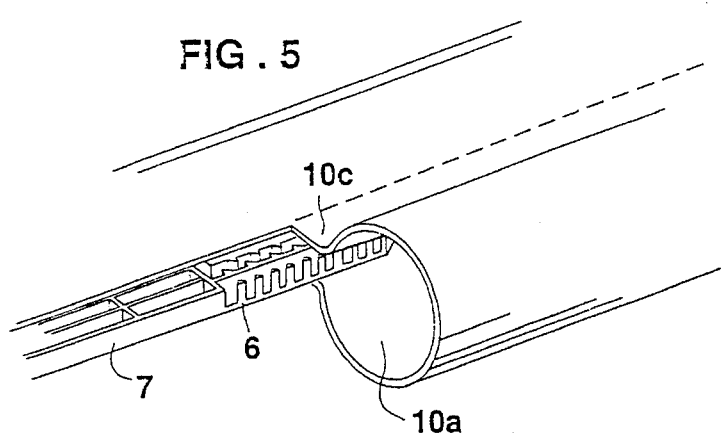
FIGS. 5, 6 and 7 are fragmentary views illustrating three different manners of introducing the preformed members into the extruded product at the time of extrusion thereof.

FIG. 5 illustrates the apparatus of FIG. 1 where the preformed members 6 are in the form of a continuous strip 7 preformed (e.g., by a stamping operation) with the pairs of the flow-reducer elements (44, 44a and 46, 46a) on opposite sides of its longitudinal axis 42 at spaced locations along the length of the strip 7.

Figure 6:
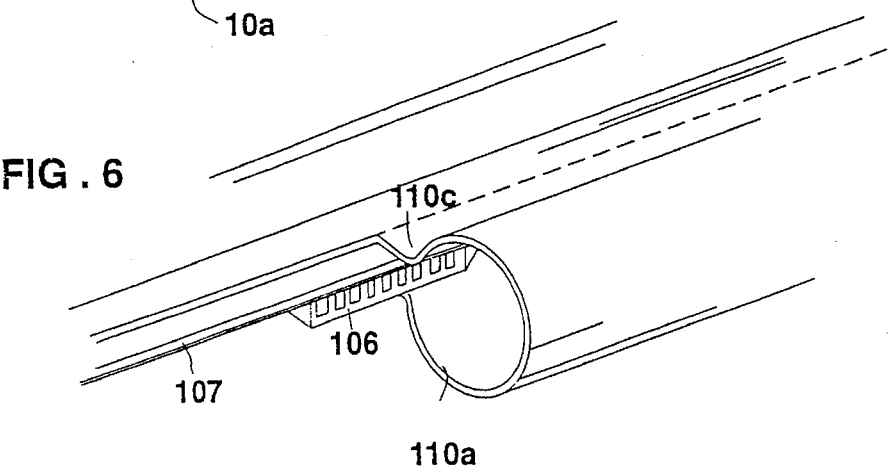

FIG. 6 illustrates a variation wherein a plurality of preformed members, designated 106, are bonded to a continuous strip 107 at spaced locations along the length of the continuous strip, and the continuous strip is bonded to the junction 110c between the two extruded tubes (on one of which is shown at 110a in FIG. 6).

Figure 7:
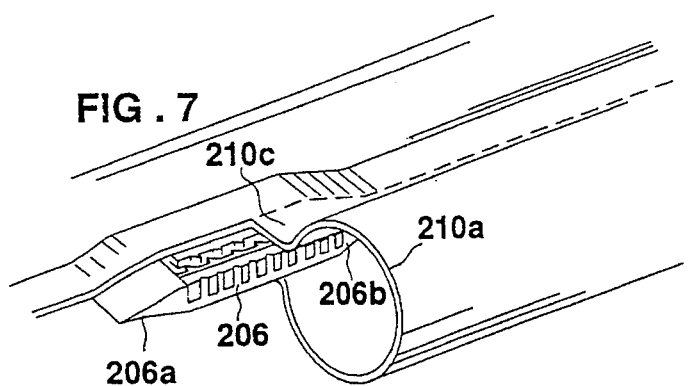

FIG. 7 illustrates a further variation wherein the preformed members, therein designated 206, are separate discrete members, a plurality of which are fed and individually bonded to the juncture 210c between the two tubes (e.g., 210a) at spaced locations along the longitudinal axis of the juncture. The leading and trailing edges of each preformed member 206 are preferably tapered, as shown at 206a, 206b, to produce a good and void-free bond between them and the juncture. A similar tapering construction may be provided in the arrangement illustrated in FIG. 6.

The feeding of the preformed members 206 may be according to the manner now used in conventional extrusion processes for making drip irrigation lines, such as illustrated in the prior patents referred to above, but preferably it is according to U.S. Pat. No. 5,282,916. FIG. 7a illustrates a modification in the apparatus of FIG. 1 for feeding the preformed members 206 in this manner, wherein it will be seen that these members are individually fed via a hopper 250 by means of a feeder 252 and an ejector 254 to the extrusion head 4. The remainder of the apparatus may be as illustrated in FIG. 1.

Figure 8:
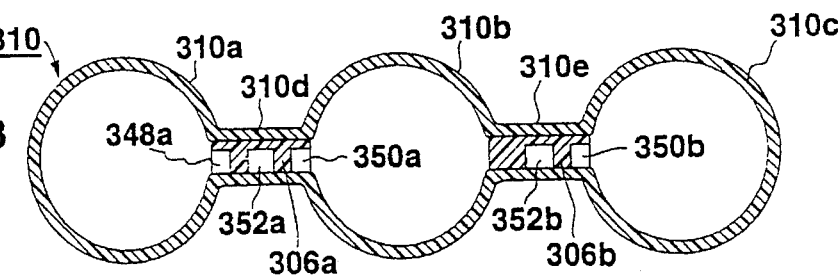
FIG. 8 is a view similar to that of FIG. 3, but showing the simultaneous formation of three (or more) tubes, with a juncture between each pair of adjacent tubes and including a plurality of the preformed elements bonded to and within each juncture.

The method and apparatus could also be advantageously used for making more than two tubes at one time. FIG. 8 illustrates making three tubes at one time. Thus, as shown in FIG. 8, three tubes 310a, 310b, 310c are extruded at one time, with a juncture 310d, 310e between each pair of adjacent tubes. Each juncture includes a preformed member 306a, 306b bonded to and within the two junctures 310d, 310e, respectively. In this case, preformed member 306a is as described above, to define the inlets 348a, 350a, to the two tubes 310a, 310b, and the common recess 352a to define the two outlets when the preformed member is slit. However, preformed member 306b does not include an inlet recess for tube 310b, but only an inlet recess 350b for tube 310c, and an outlet recess 352b for tube 310c, since tube 310b already has its inlet and outlet recesses.

FIG. 9 illustrates the application of the invention to a process and apparatus for making drip irrigation lines by using seamed tubes, rather than extruded tubes. In this case, a plastic sheet material 400 is formed to define the two tubes 410a, 410b, with the juncture 410c between them; and the preformed members 406 are bonded to and within this juncture 410c. Each preformed member 406 is constructed as described above such that when the tube doublet so produced is split along the center line (longitudinal axis) of the juncture between the two tubes 410a, 410b, by slitter 422, the two drip irrigation lines $DIL_1$, $DIL_2$ are produced as described above and as particularly illustrated in FIG. 4.

It will be appreciated that the seaming apparatus illustrated in FIG. 9 could also be used for making three or more drip irrigation lines at one time as described above with respect to FIG. 8.

Many other changes may be made. For example, the two (or more) tubes produced either by extrusion or by seaming may be the same size or of different sizes. Three (or more) tubes could be extruded in a T-configuration or a Δ-configuration, rather than in the illustrated linear configuration. The inlets to the labyrinths may be at a location other than at the edge of the preformed members. The juncture may be slit at any location along the apparatus.

While the invention has been described with respect to several preferred embodiments, it will be appreciated that these are set forth merely for purposes of example, and that many other variations, modifications and applications of the invention may be made.

We claim:

1. A method of making drip irrigation lines, comprising: preparing a plurality of preformed members of predetermined thickness each having a longitudinal axis and preformed with a pair of groove formations of smaller depth than the thickness of the preformed members, one on each side of its longitudinal axis; forming at least two tubes in side-by-side relation joined together at a juncture including said plurality of preformed members bonded to and within said juncture at spaced locations along the longitudinal axes of the preformed members and of said juncture; and slitting said juncture and said preformed members along their longitudinal axes, to thereby form at least two drip irrigation lines each integrally formed with a section of said plurality of preformed members, each section having one of said groove formations serving as a flow-reducer element in the respective line.

2. The method according to claim 1, wherein each of said preformed members is preformed with inlet recess means and with outlet recess means both located and configured such that when said juncture and preformed members are slit along their longitudinal axes, said inlet recess means serves as an inlet to each of the flow-reducer elements of the respective line, and said outlet recess means serves as an outlet from the respective flow-reducer element of the respective line.

3. The method according to claim 2, wherein said inlet recess means are in the form of a pair of edge recesses opening at opposite sides of the preformed member, and said outlet recess means are in the form of a common internal recess traversing across said longitudinal axis of the preformed member so as to be slit at the time said juncture and preformed members are slit.

4. The method according to claim 3, wherein said pair of flow-reducing groove formations, one on each side of the longitudinal axis of the preformed member, are labyrinths which communicate at one of their ends with one of said pair of edge recesses, and at their opposite ends with said common recess.

5. The method according to claim 1, wherein each of said preformed members is a continuous strip preformed with said pairs of flow-reducing groove formations at spaced locations along its longitudinal axis.

6. The method according to claim 1, wherein said plurality of preformed members are bonded to a continuous strip at spaced locations along the length of the continuous strip.

7. The method according to claim 1, wherein said plurality of said preformed members are each individually bonded to said juncture at spaced locations along the longitudinal axis thereof.

8. The method according to claim 1, wherein said tubes and said juncture are formed by extrusion, said preformed members being bonded within said juncture at the time of extrusion thereof.

9. The method according to claim 1, wherein said tubes and said juncture are formed by seaming sheet material, said preformed members being bonded within the juncture at the time of seaming thereof.

10. The method according to claim 1, wherein at least three tubes are formed and include a juncture between each pair of adjacent tubes, and a plurality of said preformed members bonded to and with each of said junctures.

11. A method of making drip irrigation lines, comprising: extruding via an extrusion head at least two tubes in side-by-side relation joined together at a juncture; feeding through said extrusion head a plurality of preformed members so as to be bonded to and within said juncture at spaced locations along the longitudinal axes of the preformed members and of said juncture; each of said preformed members being preformed with a pair of flow-reducing, groove formations, one on each side of the longitudinal axis of the preformed member; and slitting said juncture and said preformed members along their longitudinal axes, to thereby form at least two drip irrigation lines each integrally formed with a section of said plurality of preformed members, each section having one of said groove formations serving as a flow-reducer element in the respective line.

12. The method according to claim 11, wherein each of said preformed members is preformed with inlet recess means and with outlet recess means both located and configured such that when said juncture and preformed members are slit along their longitudinal axes, said inlet recess means serves as an inlet to each of the flow-reducer elements of the respective line, and said outlet recess means serves as an outlet from the respective flow-reducer element of the respective line.

13. The method according to claim 11, wherein said plurality of preformed members are in the form of a continuous strip preformed with said pairs of flow-reducing groove formations at spaced locations along its longitudinal axis.

14. The method according to claim 11, wherein said plurality of preformed members are bonded to a continuous strip at spaced locations along the length of the continuous strip.

15. The method according to claim 11, wherein said plurality of preformed members are each individually bonded to said juncture at spaced locations along the longitudinal axis thereof.

16. Apparatus for making drip irrigation lines, comprising: an extrusion head for extruding at least two tubes in side-by-side relation joined together at a juncture; a feeder for feeding a plurality of preformed members through said extrusion head and for bonding said preformed members to and within said juncture at spaced locations along the longitudinal axes of the preformed members and of said juncture; each of said preformed members being of predetermined thickness and preformed with a pair of flow-reducing, groove formations of smaller depth than the thickness of the preformed members, one on each side of the longitudinal axis of the preformed member; and a slitter for slitting said juncture and said preformed members along their longitudinal axes, to thereby produce at least two drip irrigation lines each integrally formed with a section of said plurality of preformed members, each section having one of said groove formations serving as a flow-reducer element in the respective line.

17. The apparatus according to claim 6, wherein said extrusion head extrudes only two tubes.

18. The apparatus according to claim 6, wherein said extrusion head extrudes at least three tubes with a juncture between each pair of adjacent tubes; and said feeder feeds a plurality of said preformed members and bonds them to and within each of said junctures.

* * * * *